(12) United States Patent
Barr et al.

(10) Patent No.: US 7,040,662 B2
(45) Date of Patent: May 9, 2006

(54) MUD FLAP HOLDER SYSTEM

(75) Inventors: Graylin Patrick Barr, Fresno, CA (US); William Michael Betts, IV, Piedmont, CA (US); William Michael Betts, V, Boulder, CO (US); Stanley H. Day, Fresno, CA (US)

(73) Assignee: Betts Spring Company, San Leandro, CA (US)

( * ) Notice: Subject to any disclaimer, the term of this patent is extended or adjusted under 35 U.S.C. 154(b) by 137 days.

(21) Appl. No.: 10/717,755

(22) Filed: Nov. 20, 2003

(65) Prior Publication Data

US 2005/0110266 A1    May 26, 2005

(51) Int. Cl.
*B62B 25/16* (2006.01)
(52) U.S. Cl. .................. 280/847; 280/154; 280/848; 280/851
(58) Field of Classification Search ............... 280/847, 280/152.05, 848, 154, 160, 851
See application file for complete search history.

(56) References Cited

U.S. PATENT DOCUMENTS

| | | | |
|---|---|---|---|
| 1,809,711 A | 6/1931 | Kile | |
| 3,333,868 A | 8/1967 | Sogoian | |
| 3,684,312 A | 8/1972 | Evans | |
| 3,700,260 A * | 10/1972 | Moore et al. | ............... 280/851 |
| 3,726,544 A * | 4/1973 | Miller | ......................... 280/851 |
| 3,934,901 A | 1/1976 | Hammerly | |
| 4,695,070 A | 9/1987 | Knox | |
| 4,795,121 A | 1/1989 | Comito | |
| 5,044,667 A | 9/1991 | Manning | |
| 5,915,708 A | 6/1999 | Silva | |
| 5,967,553 A | 10/1999 | Cominsky | |
| 6,116,628 A | 9/2000 | Adrian | |

* cited by examiner

*Primary Examiner*—Christopher P. Ellis
*Assistant Examiner*—Cynthia F. Collado
(74) *Attorney, Agent, or Firm*—Thomas R. Lampe

(57) ABSTRACT

A mud flap holder assembly includes a mud flap support clip bifurcated at one of the ends thereof to define an open ended variable width slot. The mud flap is held in position by a bolt positioned in the slot with portions of the support clip defining the slot forming a detent frictionally releasably engaging the flap.

9 Claims, 3 Drawing Sheets

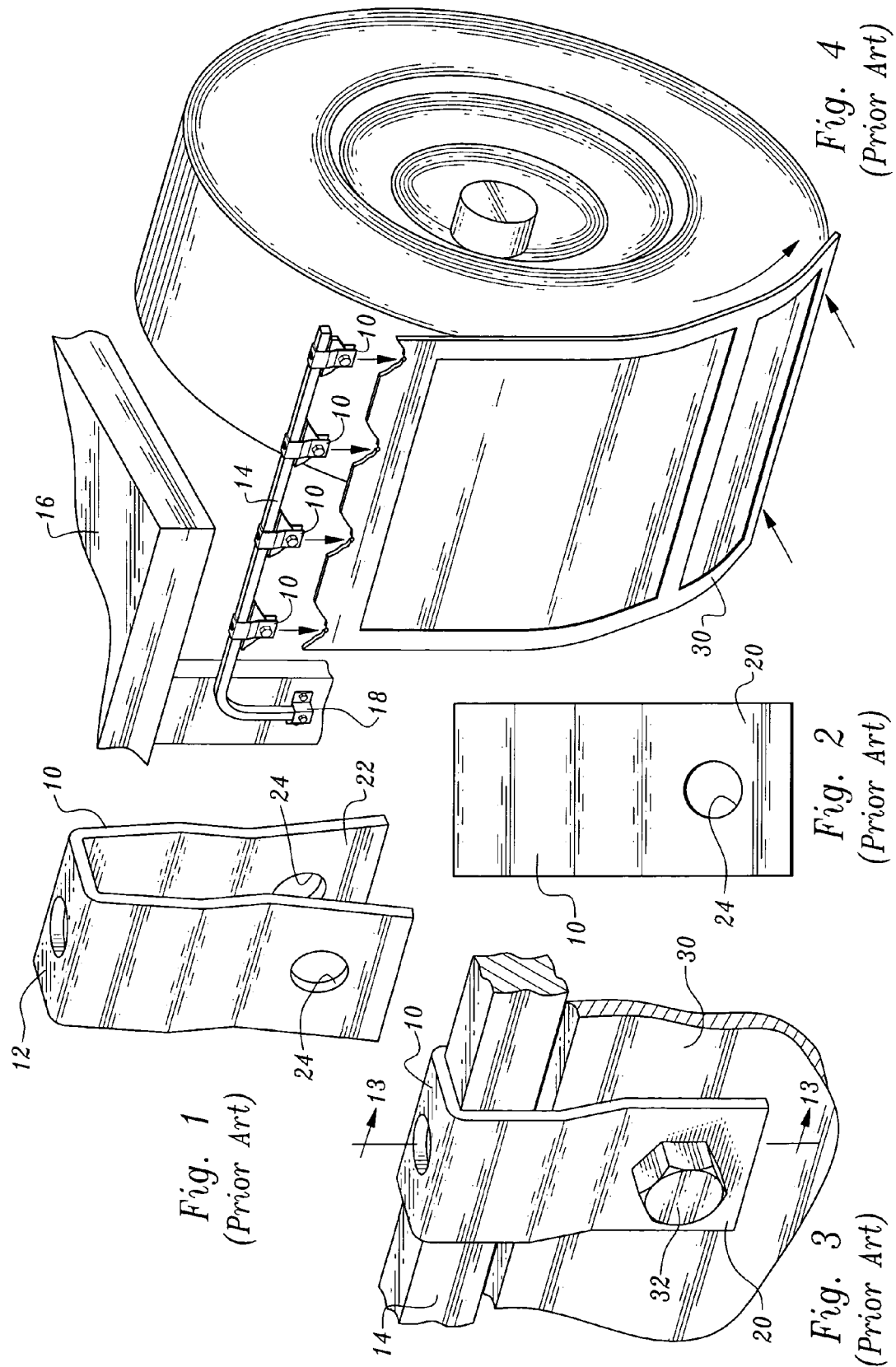

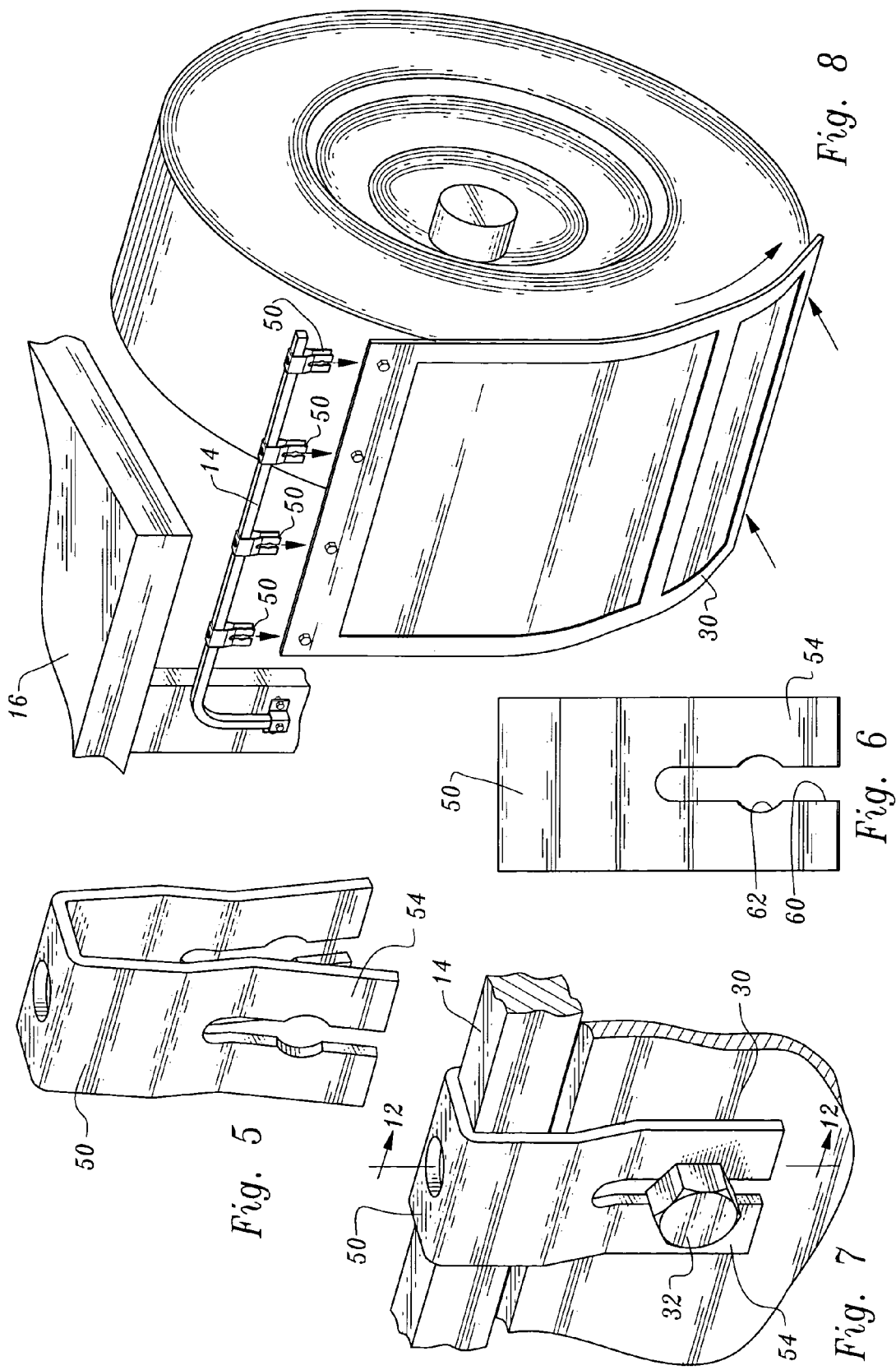

MUD FLAP HOLDER SYSTEM

TECHNICAL FIELD

The present invention relates to apparatus including mud flap holder structure which enables a mud flap on a truck or other motor vehicle to be released from the vehicle when trapped between the ground and a tire or when other pulling forces of a predetermined magnitude are applied to the mud flap to avoid damage to the mud flap and holder structure.

BACKGROUND OF THE INVENTION

Mud flap holders on large trucks are in close proximity to the driving wheels. It is a common failure mode for these flaps to become trapped between the ground and the tires, when the vehicle is traveling in reverse. This creates a strong pulling force on the flap and flap holder structure which can damage or break one or both components.

There have been various approaches meant to address this problem—typically involving a spring released channel mechanism, which is added to a standard flap and flap holder. Other designs use a series of metal stampings, working in conjunction with rubber sliding components. Such approaches add to the cost and complexity of the flap holder system and have reliability problems.

As will be seen below, in accordance with the teachings of the present invention, an existing flap holding system in widespread use is modified to provide a reliable mud flap release system. No supplemental structural components, with their attendant costs, are required to convert a standard mud flap holder assembly to one which enables a mud flap to be released when pulling forces are applied thereto to prevent damage to either the flap or the holder assembly associated therewith.

A search directed to the invention disclosed and claimed herein located the following United States Patents: U.S. Pat. No. 3,684,312, issued Aug. 15, 1972, U.S. Pat. No. 3,333,868, issued Aug. 1, 1967, U.S. Pat. No. 5,915,708, issued Jun. 29, 1999, U.S. Pat. No. 6,116,628, issued Sep. 12, 2000, U.S. Pat. No. 5,967,553, issued Oct. 19, 1999, U.S. Pat. No. 1,809,711, issued Jun. 9, 1931, U.S. Pat. No. 3,934,901, issued Jan. 27, 1976, U.S. Pat. No. 4,795,121, issued Jan. 3, 1989, U.S. Pat. No. 5,044,667, issued Sep. 3, 1991, and U.S. Pat. No. 4,695,070, issued Sep. 22, 1987. The arrangements disclosed in the above-identified patents do not teach or suggest the invention disclosed and claimed herein.

DISCLOSURE OF INVENTION

The present invention relates to a system which allows for the separation without damage of a mud flap from a holder assembly when pulling forces are exerted on the mud flap without causing damage to the flap, the assembly or related structure. The invention allows the user to easily reconnect the flap and holder. The invention does not incorporate the use of supplemental structure to carry out these objectives.

The present invention incorporates a combination including a mud flap having a top portion with a hole formed therein and a support member attachable to a motor vehicle.

Also incorporated in the combination is at least one mud flap support clip having a bifurcated clip segment forming a variable width slot open at one end.

A mud flap securement bolt passes through the hole in the top portion of the flap and is positioned in the slot. The mud flap securement bolt is frictionally engaged by the bifurcated clip segment to releasably retain the mud flap securement bolt in the slot and attached to the mud flap support clip until a pulling force exerted on the mud flap attains a predetermined magnitude. The mud flap support clip releases the mud flap securement bolt and the mud flap responsive to the pulling force.

The invention also encompasses unique mud flap holder assembly structure and a mud flap support clip of novel character.

Other features, advantages and objects of the present invention will become apparent with reference to the following description and accompanying drawings.

BRIEF DESCRIPTION OF DRAWINGS

FIG. 1 is a perspective view of a prior art mud flap support clip in current widespread usage;

FIG. 2 is a front, elevational view of the prior art mud flap support clip;

FIG. 3 illustrates the prior art support clip holding a mud flap, the support clip being disposed on an elongated support member, only portions of the support member and mud flap being shown;

FIG. 4 is a perspective view illustrating a prior art mud flap holder assembly incorporating the support clip shown in FIGS. 1–3 and illustrating a mud flap being torn away therefrom and damaged when caught between a wheel and the ground;

FIG. 5 is a perspective view of a mud flap support clip constructed in accordance with the teachings of the present invention;

FIG. 6 is a front, elevational view of the support clip of FIG. 5;

FIG. 7 is a view similar to FIG. 3, but illustrating use of the support clip of the present invention;

FIG. 8 is a view similar to FIG. 4, but illustrating what happens when a mud flap is pulled away from a mud flap holder assembly constructed in accordance with the teachings of the present invention;

BEST MODE FOR CARRYING OUT THE INVENTION

Figure 9:
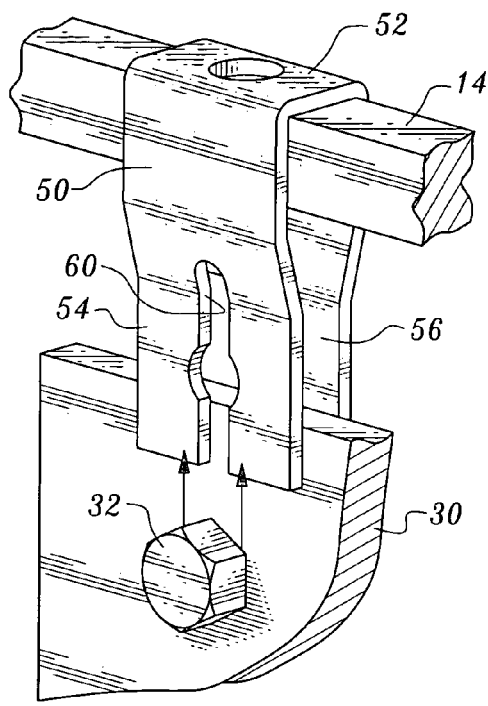
FIG. 9 is a perspective view illustrating installation of a conventional mud flap and mud flap securement bolt on the support clip of the present invention.

Referring now to FIGS. 1–4 and 13, a conventional mud flap support clip and mud flap holder assembly are illustrated.

The conventional mud flap support clip 10 is of integral construction, typically being formed from sheet metal. The support clip 10 has a flat central portion 12 which is positioned on and engages a support member 14 in the form of an elongated bent bar affixed to a vehicle 16 by a bracket 18. FIG. 4 shows four support clips 10 on the support member.

Integral with and extending downwardly from central portion 12 are two clip segments 20, 22. Holes 24 are formed in the clip segments.

Conventional mud flap 30 depends from the support clips 10. The mud flap has four apertures (not shown) formed therein which are placed in alignment with holes 24 of the support clips. Mud flap securement bolts 32 extend through holes 24 and the holes in the top portion of the flap and the mud flap is secured in place by applying nuts 34 (see FIG. 13) to the bolts and tightening them in place.

While a stable support for a mud flap is provided by the above-described prior art approach, a problem occurs when a pulling force of large magnitude is applied to the mud flap 30, for example when the mud flap is caught between the ground and a tire of the vehicle with which it is associated when the vehicle backs up. As shown in FIG. 4, this typically results in tearing or ripping of the mud flap so that it can no longer be used. It is quite possible that the mud flap holder assembly itself can be severely damaged or broken.

FIGS. 5–12 show an arrangement similar to that illustrated in FIGS. 1–4 and 13 except that a mud flap support clip 50 constructed in accordance with the teachings of the present invention is shown and utilized in the mud flap holder assembly. Components and parts the same as those shown in FIGS. 1–4 and 13 have been designated by like reference numbers.

Mud flap support clip 50 is of integral construction and may suitably be formed of sheet metal having some degree of flexibility and resiliency. Support clip 50 includes a central clip portion 52 which in the illustrated embodiment has an opening formed at the top thereof to facilitate welding of the clip to the top of support member 14. This feature, however, is not part of the present invention and is known.

The clip 50 also includes two clip segments 54, 56 extending downwardly from the central clip portion and disposed side-by-side to define a space therebetween for receiving the top portion of mud flap 30.

Each of the clip segments 54, 56 has a bifurcated end portion defining an open-ended, variable width slot 60 for receiving the shaft of mud flap securement bolt 32. This is to be compared to the completely enclosed hole 24 found in conventional clip 10. Slot 60 is enlarged at a predetermined location thereon as indicated by reference numeral 62. That is, the slot narrows below the predetermined location 62, with the bifurcated clip end portions being spaced apart a distance less than at the location of the mud flap securement bolt in the widened or enlarged area 62 of the slot. Thus, each clip segment forms a detent below location 62 to hold the mud flap in position during use. The configuration of the slot at location 62 approximates the outer configuration of the bolt shaft and the slot below the location of the shaft is narrow enough for the clip segments to engage the underside of the bolt shaft to some degree.

Figure 10:
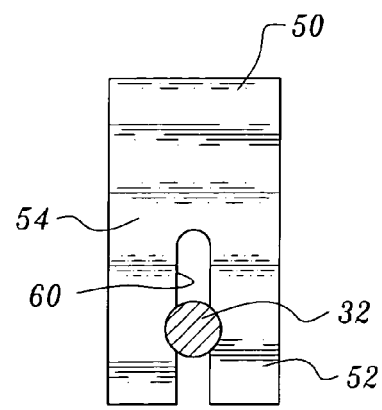
FIG. 10 is a front, elevational view of the support clip of the present invention retaining at a location within the clip a mud flap securement bolt, the latter being shown in cross-section.
Figure 11:
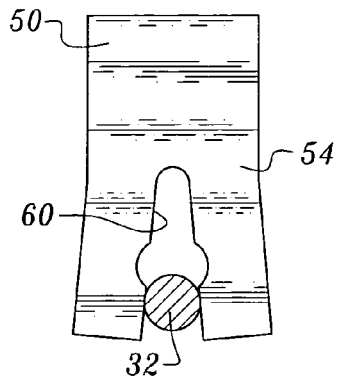
FIG. 11 is a view similar to FIG. 10, but illustrating the appearance of the support clip when the bolt is disposed below its normal retention position, for example when the bolt is being installed in place or being pulled from the clip.
Figure 12:
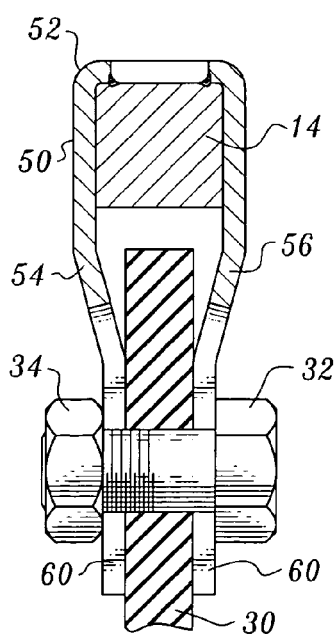
FIG. 12 is an enlarged, cross-sectional view taken along the line 12—12 in FIG. 7.
Figure 13:
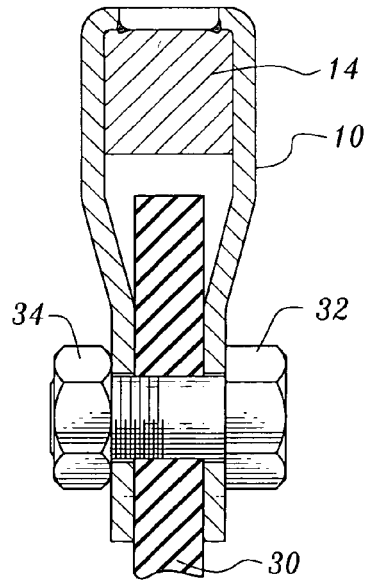
FIG. 13 is an enlarged, cross-sectional view taken along the line 13—13 in FIG. 3.

As indicated above, a material from which the support clip 50 is formed, which may for example be sheet steel, has a degree of flexibility and resiliency. FIG. 10 shows the bolt shaft of the bolt 32 in its normal position when retained in the support clip and FIG. 11 shows the bolt shaft below such position. The clip segments 54, 56 have sufficient flexibility and resiliency to enable the bifurcated portions thereof to temporarily separate to a greater degree when the bolt is either being pulled from the support clip or reinstalled therein. As shown in FIG. 8, when the mud flap is pulled free of all of the clips it remains intact. This readily allows reinstallation of the flap.

The invention claimed is:

1. A mud flap holder assembly for use with motor vehicles, said mud flap holder assembly for holding a mud flap having a top portion and at least one flap securement member extending through the top portion and projecting from opposed sides of the top portion, said mud flap holder assembly comprising in combination:

a support member attachable to a motor vehicle; and at least one mud flap support clip connected to said support member, said at least one mud flap support clip having two clip segments extending downwardly from said support member, said clip segments having bifurcated end portions with distal ends and forming slots open at lower ends thereof and extending upwardly from said distal ends, and said clip segments disposed side-by-side defining a space therebetween in communication with said slots for receiving the top portion of the mud flap with said clip segments disposed at opposed sides of the top portion and with the at least one flap securement member positioned in the slots thereof at a predetermined location and extending between and through said bifurcated end portions across the space, said slots being of variable width and narrowing below said predetermined location, with said bifurcated end portions forming detents below said predetermined location for frictionally engaging and supporting said at least one flap securement member extending across said space, said bifurcated end portions being flexible whereby a downward pulling force applied to the mud flap will cause flexing of the bifurcated end portions by said at least one flap securement member and release of the mud flap in its entirety from the mud flap holder assembly and passage of said at least one flap securement member out of said space and out of the slots through the openings at the lower ends of the slots.

2. The mud flap holder assembly according to claim 1 including a plurality of spaced mud flap support clips.

3. The mud flap holder assembly according to claim 1 wherein said at least one mud flap support clip is of integral construction and formed of sheet metal.

4. The mud flap holder assembly according to claim 1 wherein said support member is an elongated bar.

5. The mud flap holder assembly according to claim 1 wherein the configurations of the slots in the clip segments are substantially the same.

6. A mud flap support clip of unitary construction including a central clip portion and two clip segments extending downwardly from said central clip portion and disposed side by side to define a space therebetween for receiving the top portion of a mud flap, each of said clip segments having a bifurcated end portion with a distal end and defining an upwardly extending, variable width slot communicating with said space and open at a lower end thereof for receiving a mud flap securement member having a shaft of predetermined diameter at a predetermined slot location, said slot narrowing below said predetermined slot location to a width less than the predetermined diameter of the shaft of said mud flap securement member, with said bifurcated end portion forming a detent below said predetermined slot location to frictionally engage and releasably support said shaft of said mud flap securement member, said bifurcated end portions of said clip segments being flexible whereby a downward pulling force applied to a mud flap supported by the mud flap support clip will cause flexing of the bifurcated end portions by said mud flap securement member and release of the mud flap in its entirety from the mud flap support clip and passage of said shaft out of said space and out of the slots through the openings at the lower ends thereof.

7. The mud flap support clip according to claim 6 of integral construction and formed of sheet material.

8. The mud flap support clip according to claim 6 wherein said slots of the two clip segments are of substantially identical configuration and in substantial registry with one another.

9. In combination:
- a mud flap having a top portion with a hole formed therein;
- a support member attachable to a motor vehicle;
- at least one mud flap support clip connected to said support member having a bifurcated clip segment forming a variable width slot open at one end; and
- a mud flap securement bolt passing through the hole in the top portion of said mud flap positioned in said slot and frictionally engaged by said bifurcated clip segment to releasably retain said mud flap securement bolt in said slot and attached to said mud flap support clip until a pulling force applied to said mud flap attains a predetermined magnitude sufficient to cause said mud flap support clip to release said mud flap securement bolt and said mud flap, said mud flap securement bolt having a bolt head exerting compressive forces on said mud flap support clip and operable to resist pulling of said mud flap securement bolt away from said mud flap support clip.

\* \* \* \* \*